US012703266B2

(12) United States Patent
Ishikawa

(10) Patent No.: US 12,703,266 B2
(45) Date of Patent: Aug. 11, 2026

(54) VEHICLE CHARGING AND DISCHARGING SYSTEM

(71) Applicant: AISIN CORPORATION, Kariya (JP)

(72) Inventor: Hiroki Ishikawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 100 days.

(21) Appl. No.: 18/727,490

(22) PCT Filed: Feb. 28, 2023

(86) PCT No.: PCT/JP2023/007440
§ 371 (c)(1),
(2) Date: Jul. 9, 2024

(87) PCT Pub. No.: WO2023/189124
PCT Pub. Date: Oct. 5, 2023

(65) Prior Publication Data

US 2025/0074252 A1 Mar. 6, 2025

(30) Foreign Application Priority Data

Mar. 30, 2022 (JP) ................................ 2022-056244

(51) Int. Cl.
*B60L 58/18* (2019.01)
*B60L 7/10* (2006.01)
(Continued)

(52) U.S. Cl.
CPC ............... *B60L 58/18* (2019.02); *B60L 50/60* (2019.02); *B60L 53/11* (2019.02); *B60L 53/80* (2019.02); *B60L 58/12* (2019.02); *B60L 7/10* (2013.01)

(58) Field of Classification Search
CPC .......... B60L 58/18; B60L 50/60; B60L 53/11; B60L 53/80; B60L 58/12; B60L 7/10;
(Continued)

(56) References Cited

U.S. PATENT DOCUMENTS 5,565,711 A * 10/1996 Hagiwara ................ B60L 3/04 429/150
2015/0331472 A1 11/2015 Iwamoto et al.
(Continued)

FOREIGN PATENT DOCUMENTS

JP 2015-220772 A 12/2015
JP 2016-118109 A 6/2016
(Continued)

OTHER PUBLICATIONS

May 16, 2023 International Search Report issued in International Patent Application No. PCT/JP2023/007440.
(Continued)

*Primary Examiner* — Michael C Zarroli
(74) *Attorney, Agent, or Firm* — Oliff PLC

(57) ABSTRACT

A charging and discharging system includes: a rotary electric machine being able to output a driving force for traveling; a drive circuit unit for supplying electric power of a main battery to drive the rotary electric machine, and charging the main battery through regeneration of the rotary electric machine; and a control unit for controlling the drive circuit unit. The charging and discharging system is configured not to charge a backup battery connectable to the drive circuit unit through regeneration of the rotary electric machine.

7 Claims, 1 Drawing Sheet

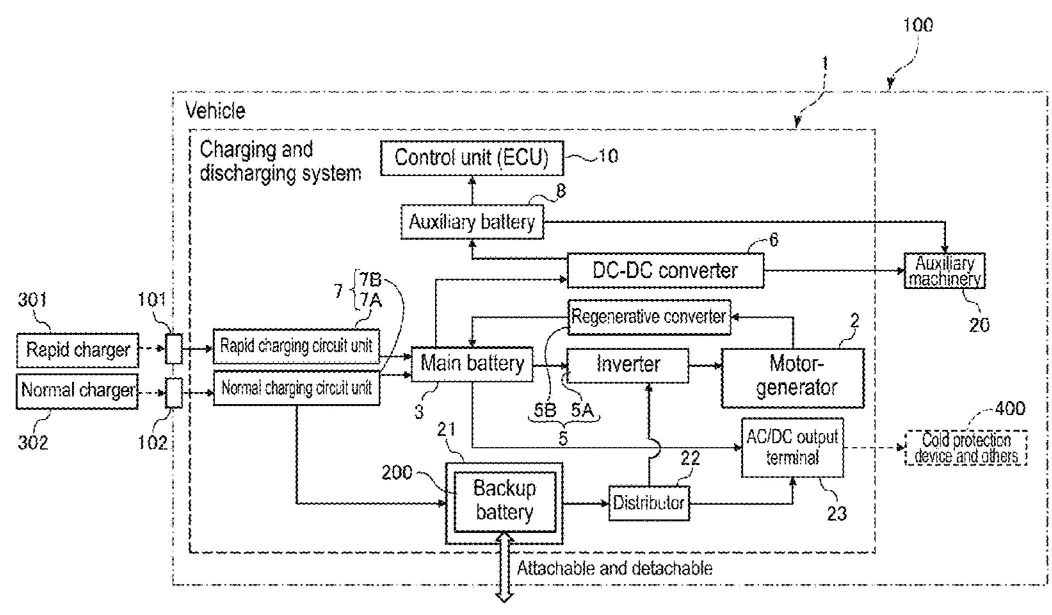

(51) Int. Cl.

| | |
|---|---|
| ***B60L 50/60*** | (2019.01) |
| ***B60L 53/10*** | (2019.01) |
| ***B60L 53/80*** | (2019.01) |
| ***B60L 58/12*** | (2019.01) |

(58) Field of Classification Search

CPC .... B60L 1/06; B60L 2210/12; B60L 2240/34; B60L 2240/547; B60L 2240/549; B60L 2250/10; B60L 2250/12; B60L 2250/16; B60L 1/006; B60L 3/04; B60L 3/12; B60L 7/16; B60L 7/18; B60L 50/51; B60L 7/14; B60L 53/14; B60L 58/14; B60L 58/20; H02J 1/08; H02J 7/342; H02J 2310/48; H02J 7/00; H02J 7/02; H02J 7/1423; Y02T 10/70

See application file for complete search history.

(56) References Cited

U.S. PATENT DOCUMENTS

| | | | | |
|---|---|---|---|---|
| 2019/0291587 | A1 | 9/2019 | Falconer et al. | |
| 2022/0360100 | A1* | 11/2022 | Takazawa | H02J 7/0063 |
| 2023/0062322 | A1* | 3/2023 | Hamamoto | H02J 7/00032 |

FOREIGN PATENT DOCUMENTS

| | | | |
|---|---|---|---|
| JP | 2017-150638 | A | 8/2017 |
| WO | 2014/115209 | A1 | 7/2014 |

OTHER PUBLICATIONS

Mar. 11, 2025 extended Search Report issued in European Patent Application No. 23779154.6.

* cited by examiner

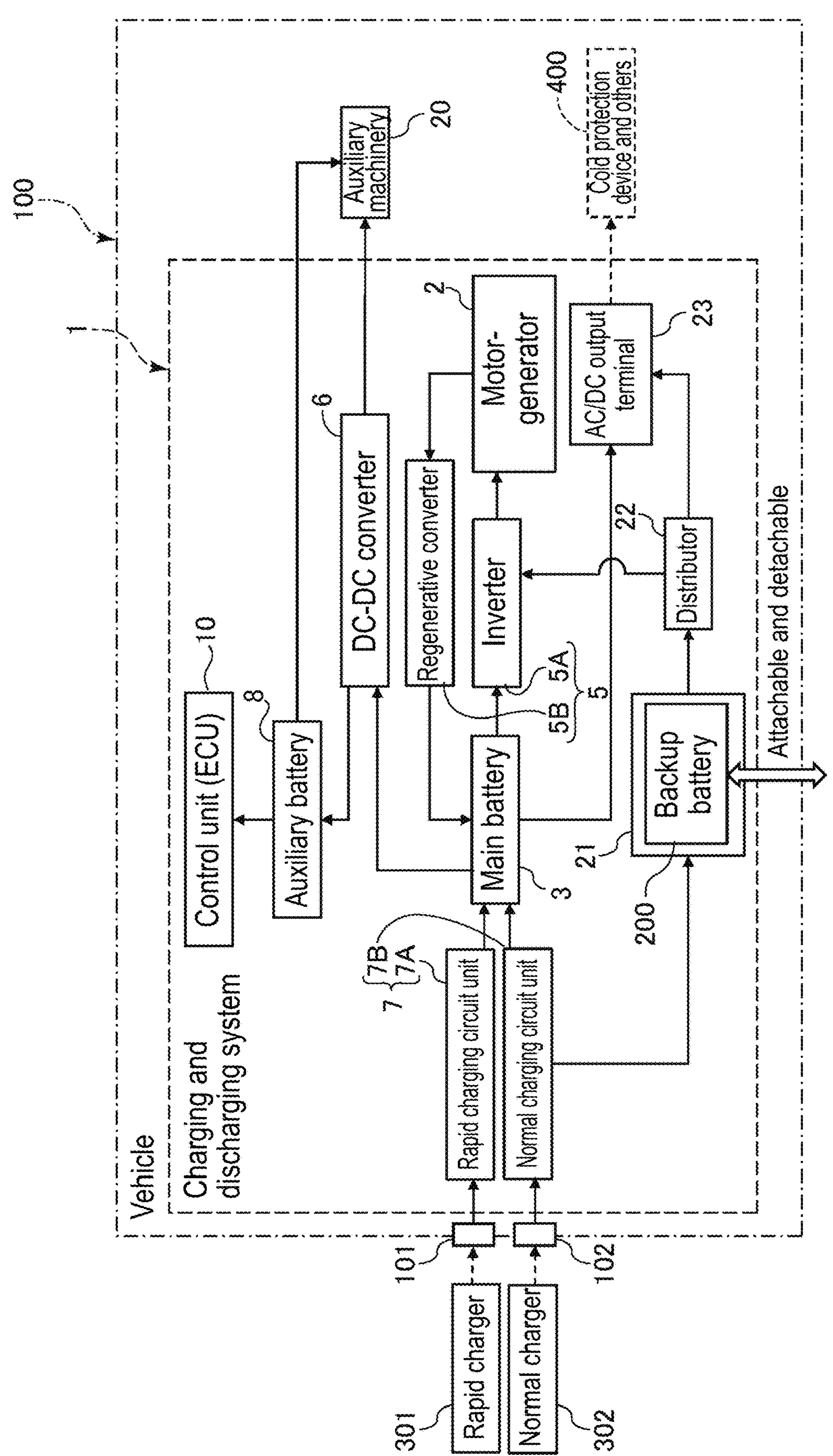
100
1
Vehicle
Charging and discharging system
Control unit (ECU)
10
Auxiliary battery
8
DC-DC converter
6
Auxiliary machinery
20
Regenerative converter
Inverter
5A
5B
5
Motor-generator
2
Main battery
3
AC/DC output terminal
23
Cold protection device and others
400
Distributor
22
Backup battery
21
200
Attachable and detachable
Rapid charging circuit unit
Normal charging circuit unit
7A
7B
7
Rapid charger
Normal charger
301
302
101
102

VEHICLE CHARGING AND DISCHARGING SYSTEM

TECHNICAL FIELD

The present disclosure relates to a vehicle charging and discharging system installed on a vehicle.

BACKGROUND ART

In recent years, a vehicle such as an electric vehicle or a plug-in hybrid vehicle is provided with a battery that supplies electric power to drive a motor-generator and collects and charges the regenerated electric power. As the battery is degraded, a chargeable capacity decreases, and a travel distance by one time of charging decreases. However, since replacement with a new battery is often expensive, there is a demand for extending the life by preventing degradation as much as possible.

Therefore, there has been proposed a configuration in which a sub battery is installed separately from a main battery, a charge usage amount (SOC) of the sub battery is made larger than that of the main battery, and the sub battery can be used with a high load (see Patent Literature 1). With this configuration, it is considered to prolong the life of the main battery and reduce the cost as a whole by allowing degradation of the sub battery and frequently perform replacement of the sub battery which is more inexpensive than the main battery.

CITATIONS LIST

Patent Literature

Patent Literature 1: JP 2016-118109 A

SUMMARY OF DISCLOSURE

Technical Problems

Meanwhile, in using a vehicle, for example, there is a possibility that charging cannot be performed due to various circumstances such as a case where the vehicle cannot escape from a traffic jam for a long time or a case where the vehicle is stuck due to bad weather (heavy snow), and so-called running out of electricity occurs in which a remaining charge amount of a battery is used up. In preparation for such a case, it is also conceivable to install in advance a backup battery allowing the vehicle to move to a place where the vehicle can be charged or securing a power source serving as a heat source for maintaining human life. However, in the configuration in which the degradation of the sub-battery is positively allowed as in Patent Literature 1, there is a possibility that the degradation of the sub-battery progresses and the sub-battery cannot function as the backup battery, when the main battery runs out of electricity.

Therefore, the present disclosure is to provide a vehicle charging and discharging system that can reduce progress of degradation of a backup battery, in which the backup battery can function as a backup battery when a main battery runs out of electricity.

Solutions to Problems

One aspect of the prevent disclosure is a vehicle charging and discharging system, including:

a rotary electric machine being able to output a driving force for traveling;

a drive circuit unit for supplying electric power of a main battery to drive the rotary electric machine, and charging the main battery through regeneration of the rotary electric machine; and a control unit for controlling the drive circuit unit, in which a backup battery connectable to the drive circuit unit is not charged by regeneration of the rotary electric machine.

As a result, the progress of degradation of the backup battery can be reduced, and the backup battery can function as a backup battery when the main battery runs out of electricity.

BRIEF DESCRIPTION OF DRAWINGS

FIG. 1 is a block diagram illustrating a vehicle charging and discharging system according to the present embodiment.

DESCRIPTION OF EMBODIMENTS

Hereinafter, a vehicle charging and discharging system according to the present embodiment will be described with reference to FIG. 1. FIG. 1 is a block diagram illustrating a vehicle charging and discharging system according to the present embodiment.

A vehicle charging and discharging system (hereinafter, simply referred to as a "charging and discharging system") 1 according to the present embodiment is installed on a vehicle 100 which is, for example, an electric vehicle. Note that, the vehicle 100 includes wheels which are not illustrated and driven by a motor-generator (hereinafter, simply referred to as a "motor") 2, a steering mechanism which steers the wheels, and the like. In addition, the vehicle 100 includes auxiliary machinery 20 such as an air conditioner, a head lamp, and a pump that supplies a refrigerant by a cooling system that cools various parts of the charging and discharging system 1.

In addition, the vehicle 100 includes a rapid charging port 101 connectable to a rapid charger 301, and a normal charging port 102 connectable to a normal charger 302. The rapid charger 301 is, for example, a charger having a voltage of 200 V and capable of supplying a larger current than that of the normal charger 302, and the normal charger 302 is, for example, a charger capable of supplying a current from a household commercial power source having a voltage of 100 V to 200 V. Note that, the rapid charger 301 may use a higher voltage than the normal charger 302.

The charging and discharging system 1 installed on the vehicle 100 mainly includes, as parts for achieving a traveling function, the motor 2 that is a rotary electric machine capable of outputting a driving force for traveling, a main battery 3 capable of storing electric power to be supplied to the motor 2, a drive circuit unit 5 including an inverter 5A and a regenerative converter 5B, and a control unit (ECU) 10. In addition, a charging circuit unit 7 having a rapid charging circuit unit 7A and a normal charging circuit unit 7B is provided as a part for externally charging the main battery 3. The rapid charging circuit unit 7A is connected to the rapid charging port 101, and the normal charging circuit unit 7B is connected to the normal charging port 102. The main battery 3 includes, for example, a lithium ion battery having a voltage of 400 V and capable of outputting a current.

That is, the main battery 3 is rapidly charged with a current larger than that of the normal charging circuit unit 7B to be described later via the rapid charging circuit unit 7A when the rapid charger 301 is connected to the rapid charging port 101, or the main battery 3 is normally charged with a current smaller than that of the rapid charging via the normal charging circuit unit 7B when the normal charger 302 is connected to the normal charging port 102.

Further, when the vehicle 100 is traveling and the vehicle 100 is accelerating, electric power is supplied from the main battery 3 to the motor 2 by PWM control or the like of the inverter 5A to drive the motor 2 so as to power the motor 2, and the wheels (not illustrated) are driven by the driving force to travel. Then, when the vehicle 100 is traveling and the vehicle 100 is decelerating, the wheels (not illustrated) are rotated by an inertial force of the vehicle 100 to rotate the motor 2, and the regenerative converter 5B causes regeneration of the motor 2, so that the regenerated electric power is recovered by the main battery 3 to charge the main battery 3. Note that, the powering and regeneration of the motor 2 are executed by the control unit 10 controlling the drive circuit unit 5 on the basis of an accelerator opening degree, a brake depression pressure amount, and the like.

Further, the charging and discharging system 1 includes: a DC-DC converter 6 connected to the main battery 3; and an auxiliary battery 8. The DC-DC converter 6 steps down a voltage of the main battery 3 to 12 V, and charges the auxiliary battery 8, which is a so-called 12 V battery, when a remaining charge amount is small. The auxiliary battery 8 supplies electric power to the auxiliary machinery 20 described above and the control unit 10 of the vehicle 100. Further, the auxiliary machinery 20 can also be supplied with electric power from the DC-DC converter 6 without via the auxiliary battery 8. Note that, electric power may also be supplied from the DC-DC converter 6 to the control unit 10 without via the auxiliary battery 8.

Further, an AC/DC output terminal 23 is also connected to the main battery 3. The AC/DC output terminal 23 is a terminal that supplies an AC current having the same voltage (for example, 100 V) as that of a so-called household outlet. That is, the AC/DC output terminal 23 incorporates an inverter circuit (not illustrated) or the like that converts a DC current into an AC current while stepping down the voltage of the main battery 3. Any electric device can be connected to the AC/DC output terminal 23 as long as electric power consumption does not exceed allowable electric power, and in particular, a cold protection device 400 such as an electric blanket described later in detail can be connected to the AC/DC output terminal.

Next, feature parts of the charging and discharging system 1 according to the present embodiment will be described. The charging and discharging system 1 includes a backup battery mounting unit 21 to which a backup battery 200 is mountable (attachable and detachable), and a distributor 22 as a switching unit. The backup battery mounting unit 21 is disposed in, for example, a trunk room of the vehicle 100, and is configured such that the backup battery 200 is attachable and detachable. The backup battery 200 is a battery having a smaller charge capacity and a smaller size than the main battery 3, and is designed to have a characteristic of an operation temperature range (usable temperature range) lower than an operation temperature range (usable temperature range) of the main battery 3.

It is recommended that the backup battery 200 be removable from the backup battery mounting unit 21 to the outside, and that basically the backup battery 200 be always mounted on the backup battery mounting unit 21. The backup battery 200 mounted on the backup battery mounting unit 21 is connected only to the normal charging circuit unit 7B of the charging circuit unit 7, that is, the backup battery 200 is configured to be capable of the normal charging described above and to be incapable of the rapid charging. In general, it is assumed that the main battery 3 of the vehicle 100 is subjected to the normal charging at home or the like, for example, while allowing the rapid charging in a service area, a commercial facility, or the like, for example. When the main battery 3 is charged by the normal charging in this way, the backup battery 200 is automatically charged each time a remaining charge amount of the backup battery 200 decreases due to natural discharge or the like.

The backup battery 200 mounted on the backup battery mounting unit 21 is connected to the distributor 22 connected individually to the inverter 5A and the AC/DC output terminal 23. The distributor 22 is configured to be able to disconnect connection between the backup battery 200 and the inverter 5A and to be able to disconnect connection between the backup battery 200 and the AC/DC output terminal 23, for example, by using a switch (not illustrated) disposed in the driver's seat. That is, the distributor 22 is interposed between the drive circuit unit 5 and the backup battery mounting unit 21, and is configured to be manually switchable between a state in which electric power from the backup battery 200 to the drive circuit unit 5 is supplied and a state in which the electric power is cut off. Similarly, the distributor 22 is interposed between the AC/DC output terminal 23 and the backup battery mounting unit 21, and is configured to be manually switchable between a state in which electric power from the backup battery 200 to the AC/DC output terminal 23 is supplied and a state in which the electric power is cut off.

Note that the switch of the distributor 22 may be two switches capable of individually switching connection of each, may be one switch configured to switch between connection and disconnection of both, or may be a dial type switch configured to select between disconnection of both, connection of one, connection of another, and connection of both.

The control unit 10 performs control to disable the switching of the distributor 22 until a remaining charge amount of the main battery 3 becomes equal to or less than a predetermined remaining amount (for example, the remaining charge amount is 20%). When the remaining charge amount becomes equal to or less than the predetermined remaining amount, the control unit 10 enables the switch of the distributor 22, that is, enables manual switching, and notifies of the fact that the switch can be switched, for example, by using a warning light, an information display, or the like. In this way, for example, by causing an occupant such as a driver to perform a manual operation, the backup battery 200 is automatically switched to prevent the backup battery 200 from running out of charged electricity without the occupant being aware.

As described above, when the remaining charge amount of the main battery 3 becomes equal to or less than the predetermined remaining amount, normal traveling using electric power of the main battery 3 can be performed only a little. Therefore, by the driver switching the switch of the distributor 22, a normal traveling mode in which the vehicle travels using electric power of the main battery 3 can be switched to a degenerate traveling mode in which the vehicle travels using electric power of the backup battery 200. Note that, assuming that the main battery 3 is a general lithium ion battery, durability may be affected when the remaining charge amount becomes a predetermined remaining amount (for example, the remaining charge amount is 20% or less). Therefore, when the remaining charge amount of the main battery 3 becomes equal to or less than the predetermined remaining amount (for example, the remaining charge amount is 20%), the control unit 10 preferably determines that the main battery 3 runs out electricity, immediately prohibits use of the main battery 3, and performs control to shift to the degenerate traveling mode.

The backup battery 200 is, for example, a battery having a voltage of 200 V, has a voltage lower than that of the main battery 3, and has a maximum charge capacity smaller than that of the main battery 3. Therefore, in this degenerate traveling mode, the control unit 10 sets a vehicle speed of the vehicle 100 to, for example, 50 km/h as the maximum speed limit, and enables traveling at a vehicle speed lower than that. By limiting the vehicle speed in this way, the maximum driving force that can be output in a case of supplying electric power of the backup battery 200 to drive the motor 2 is limited to the driving force lower than that in a case of supplying electric power of the main battery 3. Therefore, output of a large driving force is unnecessary, the electric power consumption is reduced, and a distance (cruisable distance) that the backup battery 200 can travel is secured to be as large as possible. Note that the backup battery 200 is a battery having a voltage lower than that of the main battery 3. However, since the backup battery 200 limits the maximum driving force when the motor 2 is driven in this way, the configuration eliminates necessity of boosting of the voltage to be supplied to the inverter 5A or boosting the voltage in the inverter 5A.

Further, in the degenerate traveling mode, the motor 2 is driven for powering through the inverter 5A when the driving force is output. However, when the motor 2 is regenerated by the regenerative converter 5B when the driving force is not output, the regenerated electric power is sent to the main battery 3 to charge. Therefore, when the vehicle travels in the degenerate traveling mode, the remaining charge amount of the main battery 3 slightly increases, and the increased amount is used as the driving force of the motor 2 together with electric power of the backup battery 200 when the driving force is output. In this way, even in the degenerate traveling mode, the degradation of the backup battery 200 can be prevented from progressing by not charging the backup battery 200 with regeneration of the motor 2.

Note that, a design is conceivable in which a charge capacity of the backup battery 200 is, for example, about 3.5 kWh such that the cruisable distance in the degenerate traveling mode is, for example, 50 km, at which the vehicle can travel by itself to the next parking area or service area on an expressway. The backup battery 200 having such a capacity has a weight of, for example, 10 kg to 20 kg, and can be easily carried by a person even when detached from the backup battery mounting unit 21. Further, by using the backup battery 200 such that the vehicle can travel by itself as described above, the backup battery 200 can be used as a substitute for a so-called range extender or the like that is preliminarily installed with a power generation system using an internal combustion engine.

Whereas, when the remaining charge amount of the main battery 3 becomes equal to or less than the predetermined remaining amount, and the distributor 22 can be manually switched, the switch of the distributor 22 can be switched so as to supply electric power of the backup battery 200 to the AC/DC output terminal 23, and a normal terminal output mode in which electric power of the main battery 3 is supplied to the AC/DC output terminal 23 can be switched to an backup terminal output mode.

This backup terminal output mode is on the assumption that, for example, the vehicle 100 is unable to travel due to other factors (for example, a traffic jam, a standstill, or the like). As described above, since the auxiliary machinery 20 is driven using electric power of the main battery 3, when the remaining charge amount of the main battery 3 is exhausted, a heating device among the auxiliary machinery 20 installed on the vehicle 100 such as an air conditioner and a seat heater particularly stops operating. Therefore, assuming a situation where the vehicle 100 is in a low temperature environment (for example, 0° C. or less), it is conceivable to always prepare a cold protection device (cold protection heating device), for example, an electric blanket or the like that can protect the occupant from the cold with low electric power.

Note that, for example, even if five occupants each use an electric blanket having the electric power consumption of 40 W for 12 hours, the electric blanket is about 2.4 kWh, for example, and it is sufficient if the charge capacity of the backup battery 200 is about 3.5 kWh as described above. Whereas, when an electric heater (for example, a PCT heater) that heats the entire vehicle interior is used, a heating capacity of about 5 KW is required even for a middle-sized vehicle, and the same 2.4 kWh means a charge capacity consumed in about 30 minutes.

Then, as described above, the backup battery 200 is a battery having the operation temperature range lower than the operation temperature range of the main battery 3. Therefore, even in a situation where the vehicle 100 is in a low temperature environment, the backup battery 200 does not need to be preheated to be used, and the remaining charge amount can be used up as much as possible, so that a use time of the cold protection device or the like for protecting the occupant is increased. That is, since it is not necessary to assume that the vehicle 100 uses the cold protection device or the like for protecting the occupant in an environment (a normal temperature environment or a high temperature environment) other than a low temperature environment, a low temperature compatible lithium ion battery is used for the backup battery 200.

Note that, in general, in a lithium ion battery, internal resistance increases at a low temperature, and an operating voltage decreases when the internal resistance increases. Accordingly, the output of electric power decreases, and electric power cannot be extracted due to the increased internal resistance even if the remaining charge amount remains to some extent. At a low temperature in the lithium ion battery, when a viscosity of electrolytic solution increases, lithium ions become difficult to move, and a chemical reaction at an electrode also slows down, which increases the internal resistance. Therefore, in order to lower the operation temperature range of the lithium ion battery (to prevent the increase in internal resistance even at a low temperature), an additive for coping with a low temperature is mixed into the electrolytic solution so that the electrolytic solution does not freeze, the viscosity of the electrolytic solution does not increase, and metal ions are not deposited in the electrolytic solution. The backup battery 200 includes a battery in which an additive for coping with a low temperature is mixed in the electrolytic solution in order to lower the operation temperature range.

As described above, according to the charging and discharging system 1 of the present embodiment, the backup battery 200 is not rapidly charged, so that the progress of the degradation of the backup battery 200 is reduced. Further, in the degenerate traveling mode in which the motor 2 is used to travel with electric power of the backup battery 200, the backup battery 200 is not charged during regeneration of the motor 2, which also reduces the progress of degradation of the backup battery 200. As described above, since the progress of degradation of the backup battery 200 is reduced, the backup battery 200 can be used as if a new battery, and can function as a backup battery when the remaining charge amount of the main battery becomes equal to or less than the predetermined remaining amount, that is, when running out of electricity is determined.

Further, according to the charging and discharging system 1 of the present embodiment, since the distributor 22 can manually be switched, it is possible to prevent running out of charged electricity of the backup battery 200 due to automatic switching to the backup battery 200 without the occupant being aware.

Further, in the charging and discharging system 1 of the present embodiment, when the remaining charge amount of the main battery 3 becomes equal to or less than the predetermined remaining amount, the inverter 5A of the drive circuit unit 5 is set to a state in which the motor 2 is drivable by supplying electric power of the backup battery 200. Therefore, the backup battery 200 is not used in the normal traveling mode, and a use frequency of the backup battery 200 is reduced, so that the progress of the degradation of the backup battery 200 can be reduced.

Further, in the charging and discharging system 1 of the present embodiment, the maximum driving force that can be output when the motor 2 is driven by supplying electric power of the backup battery 200 is limited to a driving force lower than the maximum driving force that can be output when the motor 2 is driven by supplying electric power of the main battery 3. Therefore, a large driving force does not need to be output, and a travelable distance (cruisable distance) of the backup battery 200 can be increased, and the electric power consumption can be reduced.

Then, according to the charging and discharging system 1 of the present embodiment, the backup battery 200 has characteristics that the usable temperature range is lower than the usable temperature range of the main battery 3. Therefore, the remaining charge amount of the backup battery 200 can be used up as much as possible even in a situation where the vehicle 100 is in a low temperature environment, and a use time of the cold protection device that protects the occupant can be increased.

Note that, in the present embodiment described above, a case has been described in which the charging and discharging system 1 is installed on the vehicle 100 as an electric vehicle. However, without limiting to this, this charging and discharging system can also act on, for example, a plug-in hybrid vehicle.

In addition, in the present embodiment, since the progress of the degradation of the backup battery 200 is reduced, the backup battery 200 does not need to be frequently replaced. However, if the backup battery 200 can no longer function as a backup battery after a long period of time has elapsed, the backup battery 200 can be taken out from the backup battery mounting unit 21 and easily replaced. Further, as normal use, the backup battery 200 may be removed from the backup battery mounting unit 21, and a device may be connected and used at leisure (for example, camping) or the like.

In addition, in the present embodiment, the description has been given in which a connection state of the backup battery 200 is manually switched by using the distributor 22, but the present disclosure is not limited thereto, and automatic switching is not excluded. For example, the switching may be automatically performed as long as the occupant is sufficiently aware of the state (for example, a state after the vehicle stops due to running out of electricity, a state in which a speed limit is limited due to the degenerate traveling, a state in which an operation of a steering wheel or an accelerator is heavy unlike a normal operation, and the like). Further, switching from the main battery 3 to the backup battery 200 is not limited to the case where the remaining charge amount of the main battery becomes equal to or less than the predetermined remaining amount, and switching may be performed in any case such as a case where the occupant determines that it is necessary.

Further, in the present embodiment, the description has been given in which the normal traveling mode is switched to the degenerate traveling mode when the main battery 3 is switched to the backup battery 200. However, the present disclosure is not limited to this, and the vehicle can travel in the same manner as in the normal traveling mode if the remaining charge amount of the backup battery 200 is sufficiently large.

Further, in the present embodiment, the description has been given in which the backup battery 200 has the operation temperature range lower than the operation temperature range of the main battery 3. However, the present disclosure is not thereto, and the backup battery can naturally function as a backup even if the backup battery has the same operation temperature range.

Further, in the present embodiment, the description has been given in which the charging and discharging system 1 includes the main battery 3, the DC-DC converter 6, the accessory battery 8, the rapid charging circuit unit 7A, the normal charging circuit unit 7B, the distributor 22, the AC/DC output terminal 23, and the like. However, these may simply be provided as necessary, in other words, these may not be provided in the vehicle 100 in the first place, or may be provided externally to the charging and discharging system 1, for example.

Summary of Present Embodiment

This vehicle charging and discharging system (1) preferably includes:

- a rotary electric machine (2) being able to output a driving force for traveling;
- a drive circuit unit (5) for supplying electric power of a main battery (3) to drive the rotary electric machine (2), and charging the main battery (3) through regeneration of the rotary electric machine (2); and
- a control unit (10) for controlling the drive circuit unit (5), in which
- a backup battery (200) connectable to the drive circuit unit (5) is preferably not charged by regeneration of the rotary electric machine (2).

Consequently, the backup battery 200 is not charged during regeneration of the motor 2, so that the progress of the degradation of the backup battery 200 can be reduced.

Further, the vehicle charging and discharging system (1) preferably includes:

- a normal charging circuit unit (7B) connected to a normal charger (302) and being able to charge the main battery (3) and;
- a rapid charging circuit unit (7A) that is connected to a rapid charger (301) being able to supply electric power larger than electric power of the normal charger (302) and is able to charge the main battery (3), in which the backup battery (200) is preferably chargeable only from the normal charging circuit unit (7B).

Consequently, the backup battery 200 is not rapidly charged, so that the progress of the degradation of the backup battery 200 can be reduced.

Further, in the vehicle charging and discharging system (1), the backup battery (200) is preferably attachable to and detachable from a backup battery mounting unit (21).

Consequently, the backup battery 200 can easily be replaced.

Further, the vehicle charging and discharging system (1) preferably includes:

a switching unit (22) that is interposed between the drive circuit unit (5) and the backup battery mounting unit (21) and is manually switchable between a state of supplying electric power from the backup battery (200) to the drive circuit unit (5) and a state of cutting off electric power from the backup battery (200) to the drive circuit unit (5).

Consequently, since the distributor 22 can manually be switched, the electric power supply is automatically switched from the main battery 3 to the backup battery 200, so that running out of the backup battery 200 without the occupant being aware can be prevented.

Further, in the vehicle charging and discharging system (1), when a remaining charge amount of the main battery (3) becomes equal to or less than a predetermined remaining amount, the control unit (10) preferably brings the drive circuit unit (5) into a state in which the rotary electric machine (2) is drivable by supplying electric power of the backup battery (200).

Consequently, the backup battery 200 is not used in the normal traveling mode, and a use frequency of the backup battery 200 can be reduced, so that the progress of the degradation of the backup battery 200 can be reduced.

The present disclosure is industrially applicable as a vehicle charging and discharging system installed on a vehicle such as an automobile or a truck.

REFERENCE SIGNS LIST

1: Vehicle charging and discharging system, 2: Rotary electric machine (motor), 3: Main battery, 5: Drive circuit unit, 7A: Rapid charging circuit unit, 7B: Normal charging circuit unit, 10: Control unit, 21: Backup battery mounting unit, 22: Switching unit (distributor), 200: Backup battery, 301: Rapid charger, and 302: Normal charger

The invention claimed is:

1. A vehicle charging and discharging system, comprising:

a rotary electric machine being able to output a driving force for traveling;

a drive circuit unit for supplying electric power of a main battery to drive the rotary electric machine, and charging the main battery through regeneration of the rotary electric machine;

a control unit for controlling the drive circuit unit, wherein a backup battery connectable to the drive circuit unit is not charged by regeneration of the rotary electric machine;

a normal charging circuit unit connected to a normal charger and being able to charge the main battery; and a rapid charging circuit unit connected to a rapid charger being able to supply electric power larger than electric power of the normal charger, the rapid charging circuit unit being able to charge the main battery, wherein the backup battery is chargeable only from the normal charging circuit unit.

2. The vehicle charging and discharging system according to claim 1, wherein the backup battery is attachable to and detachable from a backup battery mounting unit.

3. The vehicle charging and discharging system according to claim 2, comprising:

a switching unit that is interposed between the drive circuit unit and the backup battery mounting unit and is manually switchable between a state of supplying electric power from the backup battery to the drive circuit unit and a state of cutting off electric power from the backup battery to the drive circuit unit.

4. The vehicle charging and discharging system according to claim 1, wherein when a remaining charge amount of the main battery becomes equal to or less than a predetermined remaining amount, the control unit brings the drive circuit unit into a state in which the rotary electric machine is drivable by supplying electric power of the backup battery.

5. The vehicle charging and discharging system according to claim 2, wherein when a remaining charge amount of the main battery becomes equal to or less than a predetermined remaining amount, the control unit brings the drive circuit unit into a state in which the rotary electric machine is drivable by supplying electric power of the backup battery.

6. The vehicle charging and discharging system according to claim 3, wherein when a remaining charge amount of the main battery becomes equal to or less than a predetermined remaining amount, the control unit brings the drive circuit unit into a state in which the rotary electric machine is drivable by supplying electric power of the backup battery.

7. A vehicle charging and discharging system, comprising:

a rotary electric machine being able to output a driving force for traveling;

a drive circuit unit for supplying electric power of a main battery to drive the rotary electric machine, and charging the main battery through regeneration of the rotary electric machine; and a control unit for controlling the drive circuit unit, wherein:

a backup battery connectable to the drive circuit unit is not changed by regeneration of the rotary electric machine, and when a remaining charge amount of the main battery becomes equal to or less than a predetermined remaining amount, the control unit brings the drive circuit unit into a state in which the rotary electric machine is drivable by supplying electric power of the backup battery.

* * * * *